(12) United States Patent
Uematsu

(10) Patent No.: US 6,312,055 B1
(45) Date of Patent: Nov. 6, 2001

(54) LOCK DEVICE OF SEATBACK

(75) Inventor: Noboru Uematsu, Yokohama (JP)

(73) Assignee: OHI Seisakusho Co., Ltd., Yokohama (JP)

( * ) Notice: Subject to any disclaimer, the term of this patent is extended or adjusted under 35 U.S.C. 154(b) by 0 days.

(21) Appl. No.: 09/562,285

(22) Filed: May 1, 2000

(30) Foreign Application Priority Data

May 21, 1999 (JP) .................................................. 11-141475

(51) Int. Cl.$^7$ ...................................................... B60N 2/02
(52) U.S. Cl. .............................. 297/378.13; 297/378.12; 296/65.17
(58) Field of Search ........................... 297/378.1, 378.12, 297/378.13; 296/65.01, 65.17

(56) References Cited

U.S. PATENT DOCUMENTS

| | | | |
|---|---|---|---|
| 4,561,694 | * 12/1985 | Mouri et al. | 297/378.13 |
| 5,562,325 | * 10/1996 | Moberg | 297/328.13 |
| 5,664,839 | * 9/1997 | Pedronno et al. | 297/378.13 |
| 5,713,634 | * 2/1998 | Koike | 297/378.13 |
| 6,132,000 | * 10/2000 | Tanaka | 297/378.13 |

FOREIGN PATENT DOCUMENTS 7-10946   3/1995   (JP) .

* cited by examiner

*Primary Examiner*—Anthony D. Barfield
(74) *Attorney, Agent, or Firm*—Foley & Lardner

(57) ABSTRACT

A lock device of a pivotal seatback for an improved external view has no protrusion extending into the vehicle compartment. The lock device has a base plate secured to the seatback. A lock pin is held by the base plate and movable between locking and unlocking positions. A compression spring is disposed about the lock pin to bias the same toward the locking position. A lock plate is secured to a fixed member such a wall of a vehicle body. The lock plate has a plurality of lined lock holes with which the lock pin is engageable when assuming the locking position and a guide slot which extends along the lined lock holes. A lift plate is pivotally held by the base plate. The lift plate lifts the lock pin to the unlocking position when pivoted to a lift position from a rest position. A lift lever is pivotally held by the base plate. The lift lever has a first arm portion which contacts the lift plate and a second arm portion which enters the guide slot. The lift lever pivots the lift plate to the lift position when pivoted to a lift position from a rest position. A coil spring is employed for biasing both the lift plate and the lift lever to assume their respective rest positions.

14 Claims, 4 Drawing Sheets

LOCK DEVICE OF SEATBACK

BACKGROUND OF THE INVENTION

1. Field of the Invention

The present invention relates to a lock device for seatback which can hold a seatback of a vehicle seat at a predetermined angle, and which can self-lock upon upward pivoting of the seatback.

2. Description of the Prior Art

Hitherto, various types of lock devices for automotive pivotal seatback have been developed, one of which is described in Japanese Utility Model Second Publication 7-10946.

The lock device of the publication generally comprises a lock pin provided in the seatback, a spring for biasing the lock pin toward a lock position and a lock plate fixed to a side wall of a vehicle. That is, when the seatback comes to a desired angular position relative to a seat cushion, the lock pin is engaged with a lock hole of the lock plate due to the force of the spring. Upon this, the seatback is locked at the desired angular position. The lock device further comprises a self-lock mechanism by which self-locking of the lock device is carried out upon pivoting of the seatback from a forward folded position to a raised position. The self-lock mechanism comprises a guided pin fixed to the lock pin and a guide portion provided by the lock plate. Upon the upward pivoting of the seatback, the guided pin rises up and slides on the guide portion until the lock pin arrives at a position at which it engages with the lock hole. That is, until arrival of the lock pin at the position, the guided pin holds the lock pin at an unlocking position against the force of the spring, and thus upon arrival, the lock pin is moved until it engages the lock hole, enabling self-locking of the lock device.

However, since the guide portion provided by the lock plate is exposed to the vehicle compartment, the conventional lock device has an unsatisfactory external view. Furthermore, noise is produced by the sliding of the guided pin in the guide portion because the sliding is done against the force of the spring. Furthermore, when forward pivoting of the seatback is needed, the lock pin must be lifted high enough to avoid collision with the guide portion that tends to occur during the forward pivoting of the seatback. Thus, a large manipulated variable of the lock pin is needed, which causes poor operability of the lock device.

SUMMARY OF THE INVENTION

It is therefore an object of the present invention to provide a lock device of a seatback having an improved external view due to no protrusion extending into the vehicle compartment.

It is another object of the present invention to provide such a lock device which self-locks upon upward pivoting of the seatback.

It is still another object of the present invention to provide such a lock device which has improved operability upon forward pivoting.

It is further object of the present invention to provide a measure for solving the above-mentioned drawback.

According to the present invention, there is provided a lock device which comprises a base plate fixed to a seatback having a lock pin biased by a spring. The lock pin engages a lock hole formed in a lock plate provided in a side wall of a vehicle body. The seatback is held at a predetermined angle by a lock device. A lift lever having two arm portions is held in a rest position by a force of a spring and pivotally connects to the seatback. Upon upward pivoting of the seatback, one arm portion contacts the front edge of the lock plate and pivots in a certain direction bringing about a pivoting of the other arm portion toward an unlocking position, enabling self-locking.

According to the present invention, there is further provided a lock device which comprises a lock plate having a guide slot into which one arm portion of a lifter lever enters upon upward pivoting of the seatback. The arm portion contacts an end of the guide slot upon forward pivoting of the seatback. The lifter lever reversely pivots from a rest position toward an unlocking position, and the arm portion is withdrawn from the guide slot, enabling forward pivoting of the seatback.

According to the present invention, there is further provided a lock device in which, upon upward pivoting of a seatback, a lift lever pivots and a lock pin moves toward an unlocking position, enabling self-locking. The self-locking is smoothly achieved, and there is no protrusion inside of the vehicle compartment, improving the external view.

According to the present invention, there is further provided a lock device in which, upon forward pivoting of a seatback, a lift lever reversely pivots and is withdrawn from a guide slot of a lock plate. Thus a large operating stroke of a lock pin is unnecessary, and the seatback can be easily pivoted forward, improving the operability of the lock device.

According to the present invention, there is provided a lock device of a pivotal seatback which comprises a base plate secured to the seatback; a lock pin held by the base plate, the lock pin being axially movable between locking and unlocking positions; first biasing means for biasing the lock pin toward the locking position; a lock plate secured to a fixed member, the lock plate having a plurality of lock holes with which the lock pin is engageable when assuming the locking position; a lift plate pivotally held by the base plate, the lift plate lifting the lock pin to the unlocking position when pivoted to a lift position from a rest position; a lift lever pivotally held by the base plate, the lift lever having first and second arm portions, the first arm portion being in contact with the lift plate so that when pivoted to a lift position from a rest position, the lift lever pivots the lift plate to the lift position; and second biasing means for biasing both the lift plate and the lift lever to assume their respective rest positions.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
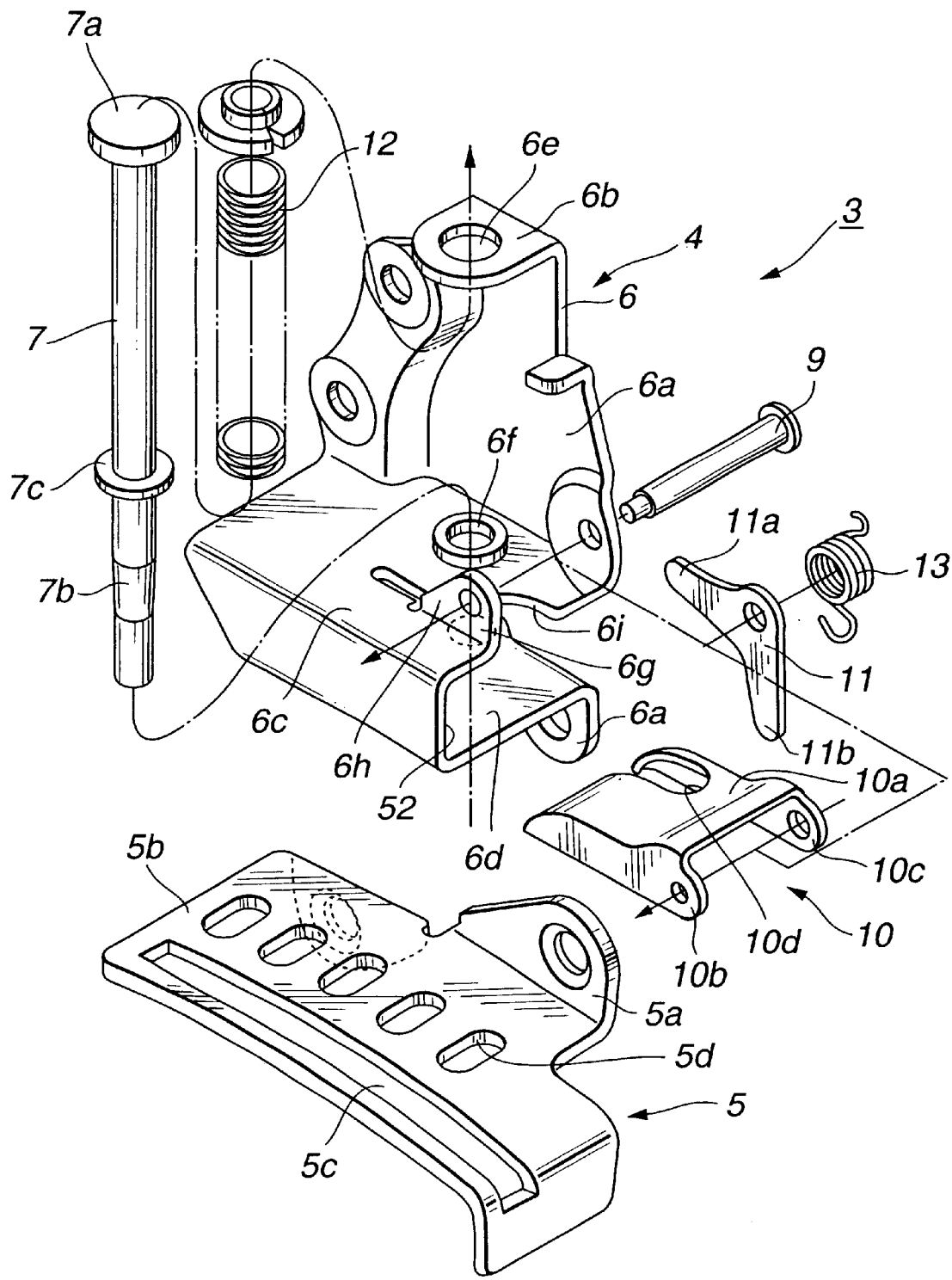
FIG. 1 is an exploded perspective view of a lock device according to the present invention.

Referring to FIGS. 1–7, particularly FIG. 1, there is shown a lock device of the present invention, which is generally designated by numeral (3).

Figure 7:
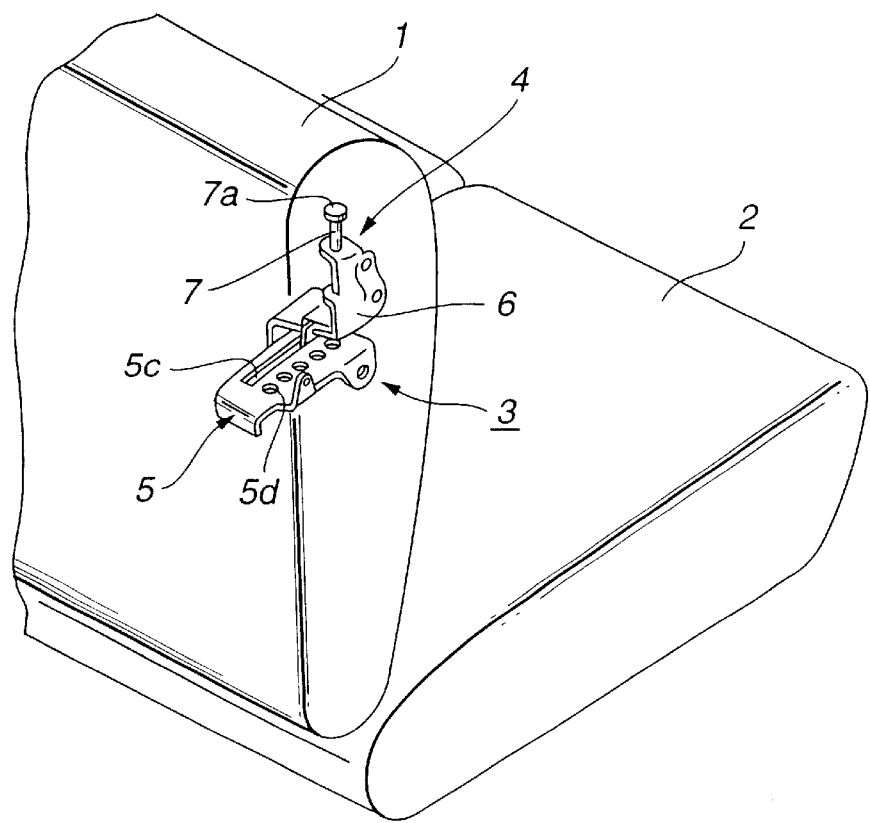
FIG. 7 is a perspective view of an automotive seat having a seatback to which the lock device of the invention is attached.

FIG. 7 shows an automotive rear seat having a seatback (1) to which the lock device (3) of the invention is attached.

The seatback (1) is supported on a rear end of a seat cushion (2) by a hinge structure (not shown) to pivot between a raised position as shown and a forwardly folded position (not shown). The lock device (3) holds the seatback (1) at a predetermined angle and releases the seatback (1) from such an angle.

The lock device (3) comprises a lock structure (4) which is mounted to an outside upper portion of the seatback (1) and a lock plate (5) which is mounted to a side wall (50, see FIG. 3) of a vehicle body.

As is clearly shown in FIG. 1, the lock structure (4) comprises a base plate (6) having a vertical attachment piece (6a) to which an upper support piece (6b), a central support piece (6c) and a lower support piece (6d) are integrally and horizontally connected.

Figure 3:
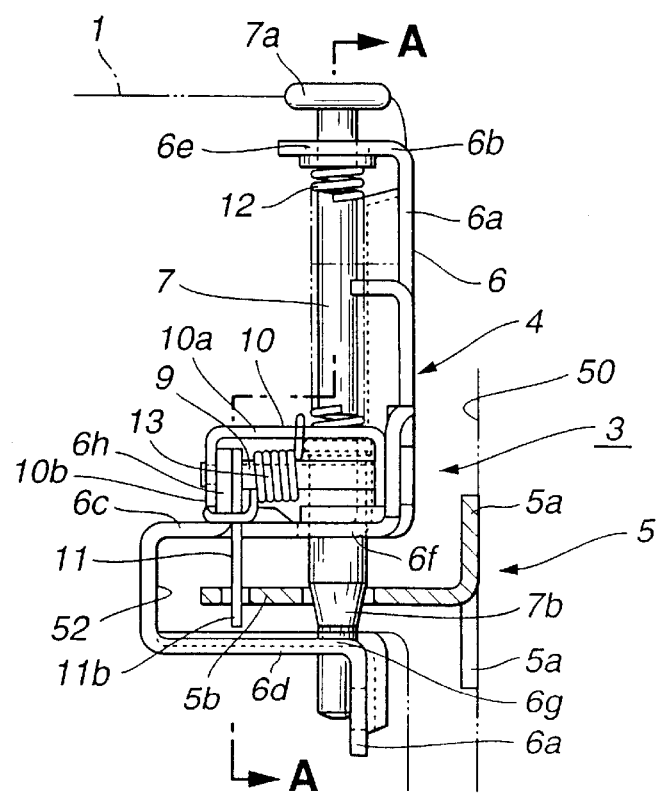
FIG. 3 is a sectional front view of the lock device.

As is seen from FIGS. 3 and 7, the base plate (6) is fixed vertically at the vertical attachment piece (6a) thereof to the outside upper portion of the seatback (1) by a plurality of bolts (not shown). As is seen from FIG. 3, upon fixing of the piece (6a), the three support pieces (6b), (6c) and (6d) are all inserted into the body of the seatback (1), and the center support piece (6c) and the lower support piece (6d) define therebetween a groove (52) which constitutes part of an arcuate groove (not shown) formed in the outside upper portion of the seatback (1).

As is seen from FIG. 3, the lock plate (5) is fixed to the side wall (50) of the vehicle body at a position that faces the groove (52) when the seatback (1) assumes the raised position.

Referring back to FIG. 1, the three support pieces (6b), (6c), and (6d) have support holes (6e), (6f), and (6g) respectively, which are aligned.

A lock pin (7) is axially movably inserted in the aligned support holes (6e), (6f), and (6g) of the support pieces (6b), (6c), and (6d). The lock pin (7) has a grip (7a) formed at its upper end and an engaging portion (7b) at its lower portion. As is seen from FIG. 4, the grip (7a) can protrude from the seatback (1) when the lock pin (7) assumes its uppermost position.

The lower engaging portion (7b) of the lock pin (7) has a tapered surface and is engageable with one of lined lock holes (5d) formed in the lock plate (5) as will be described in detail hereinafter. The lock pin (7) has further a spring seat (7c) above the engaging portion (7b).

A vertical support piece (6h) projects from the center support piece (6c). To the vertical support piece (6h) and the vertical attachment piece (6a), a lift plate (10) and a lift lever (11) are pivotally connected by a common horizontal shaft (9). The lift plate (10) includes a center major part (10a) and two side parts (10b, 10c).

As is understood from FIG. 3, the side part (10b) is positioned at the outside of the vertical support piece (6h), and the side part (10c) at the inside of the vertical attachment piece (6a). The center major part (10a) is formed with a rounded recess (10d) for slidably receiving a lower portion of the lock pin (7), that is, the portion below the spring seat (7c).

As is seen from FIG. 3, the common horizontal shaft (9) passes through the side parts (10b, 10c) of the lift plate (10) and the lift lever (11) is placed between the side parts (10b, 10c), near the side part (10b).

A compression spring (12) biases the lock pin (7) to bias the same in the locking direction, that is, downward in the drawings. For such biasing, the spring (12) is compressed between the upper support piece (6b) and the spring seat (7c). A coil spring (13) biases the common horizontal shaft (9), which has one end hooked on the center major part (10a) and the other end hooked on the side part (10b). Due to the force of the coil spring (13) and the compression spring (12), the lift lever (11) is biased downward to assume a rest position as shown in FIG. 2.

The lift lever (11) has a first arm portion (11a) which can contact the lower surface of the center major part (10a) of the lift plate (10), and a second arm portion (11b) which extends downward to a space (that is, groove 52) defined between the central support piece (6c) and the lower support piece (6d). For this downward extending of the second arm portion (11b), the center support piece (6c) is formed with a curved cut (6i), as shown.

Figure 2:
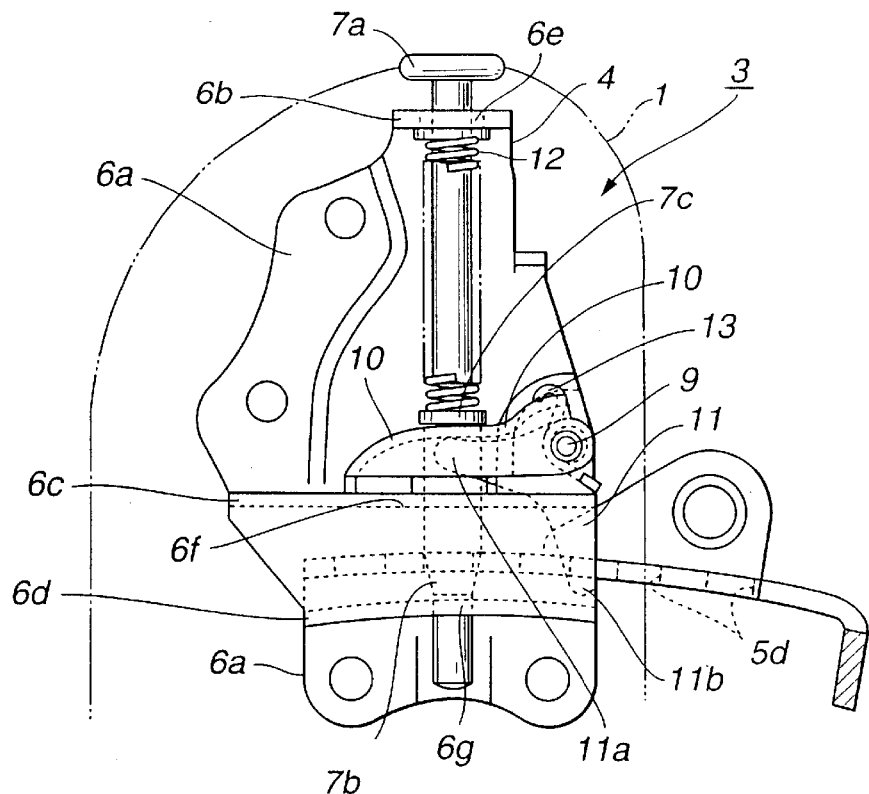
FIG. 2 is a side view of the lock device in a locked state.

As is seen from FIG. 2, usually, due to the force of the coil spring (13), the lift lever (11) assumes the rest position having the second arm portion (11b) directed downward, and the lift plate (10) is held at a horizontal or rest position in contact with the central support piece (6c). When, under this condition, the lift plate (10) is pivoted up toward an unlocking position, that is, in a clockwise direction in FIG. 2 by the lift lever (11), the lift plate (10) pushes the spring seat (7c) of the lock pin (7) upward, and thus the lock pin (7) is moved up to an unlocking position thereby disengaging the engaging portion (7b) thereof from the lock hole (5d) as is seen from FIG. 6.

As is seen from FIGS. 1 and 3, the lock plate (5) comprises an upward attachment portion (5a) fixed by bolts to the side wall (50) of the vehicle body and an approximately horizontal base portion (5b) which is slightly curved. The base portion (5b) is formed with a guide slot (5c) and a plurality of lock holes (5d). As shown, the guide slot (5c) extends along the lock holes (5d).

In the following, operation of the lock device of the present invention will be described with reference to the drawings.

For ease of understanding, the description will be commenced with respect to a raised locked condition of the seatback (1), as shown in FIG. 2.

In this condition, the engaging portion (7b) is engaged with one of the lock holes (5d) of the lock plate (5) with the aid of the force of the compression spring (12), and as has been described hereinabove, the lift plate (10) and the lift lever (11) assume their rest positions with the aid of the force of the coil spring (13). The second arm portion (11b) of the lift lever (11) is freely put in the guide slot (5c) of the lock plate (5).

When now the grip (7a) of the lock pin (7) is pulled up by, for example, the operator against the force of the compression spring (12), the engaging portion (7b) is withdrawn from the lock hole (5d) thereby canceling the locked condition of the seatback (1). It is to be noted that during the upward movement of the lock pin (7), the lift plate (10) and the lift lever (11) keep their rest positions due to the force of the coil spring (13).

If, under this unlocked condition, a new raised position of the seatback (1) is needed, a certain external force is applied to the seatback (1) to pivot the same. When the seatback (1) is thus pivoted to the new raised position, the grip (7a) should be released by the operator. Upon this, the engaging portion (7b) of the lock pin (7) is moved until it engages a corresponding new lock hole (5d), locking the seatback (1) at the new raised position.

Figure 4:
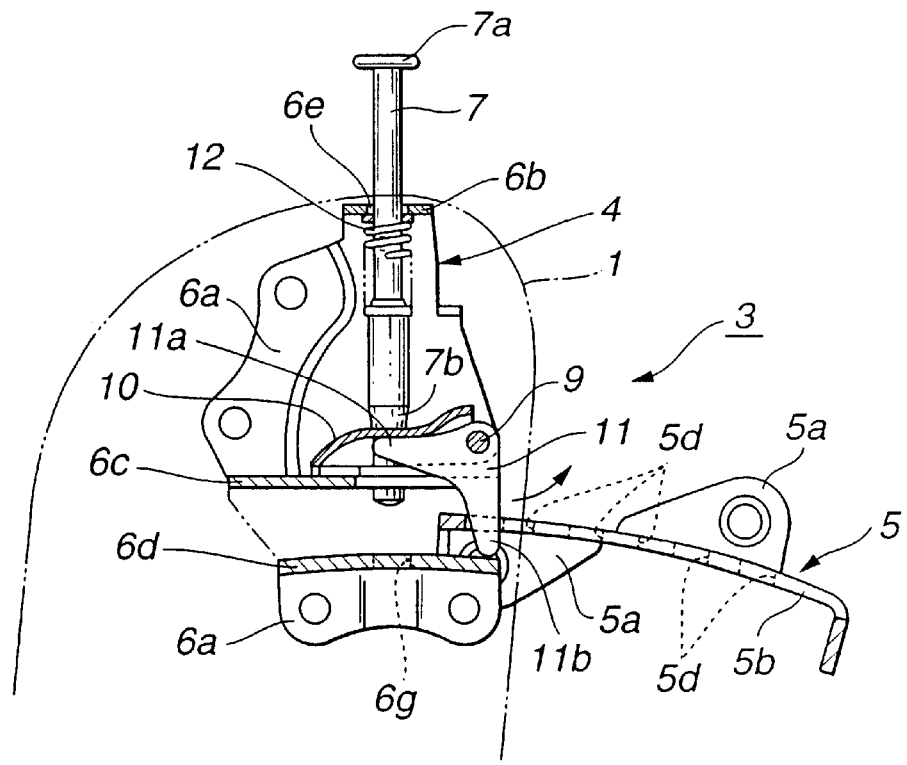
FIG. 4 is a sectional side view of the lock device taken along the line A—A of FIG. 3, showing a condition wherein the lock pin is released.
Figure 5:
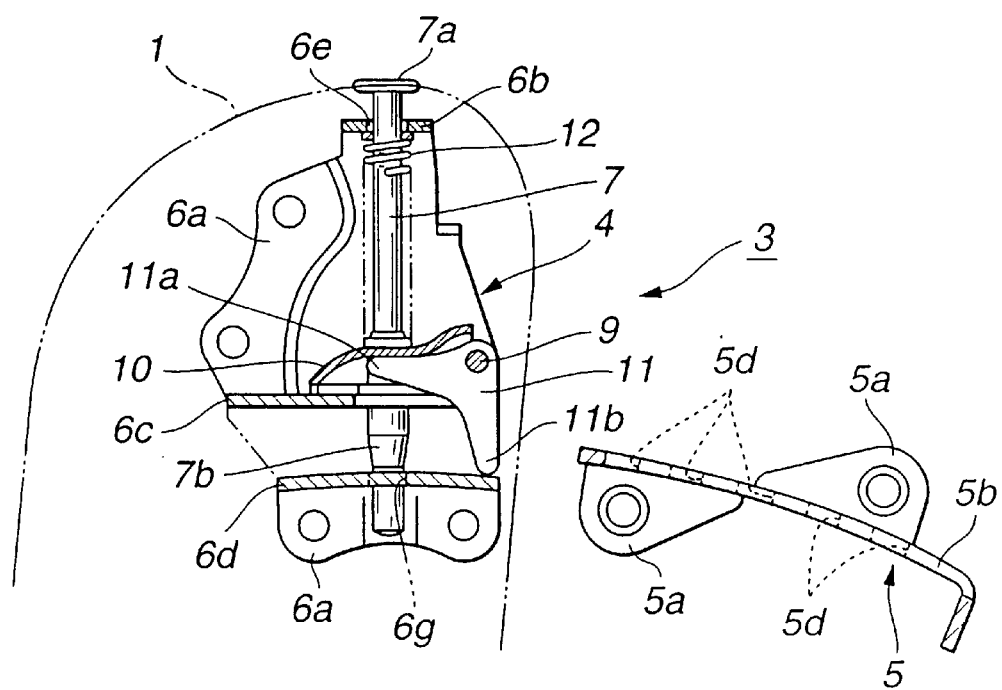
FIG. 5 is a sectional view similar to FIG. 4, but showing a condition wherein the seatback is pivoted forward.

If, under the unlocked condition of the seatback (1), a large external force is applied to the seatback (1) in a forward direction, that is, leftward in FIG. 4, the seatback (1) can pivot forward to its flat or forwardly folded position from the raised position. As is understood from this drawing, at an early stage of this forward pivoting, the second arm portion (11b) of the lift lever (11) travels forward in the guide slot (5c), collides with the front edge of the guide slot (5c) to turn counterclockwise and then, as is seen from FIG. 5, is withdrawn from the lock plate (5). Thus, thereafter, the seatback (1) can be freely pivoted forward to the flat position. Under this condition, the lock pin (7) assumes its lowermost position, and the lift plate (10) and the lift lever (11) assume their rest positions, as shown in FIG. 5.

Figure 6:
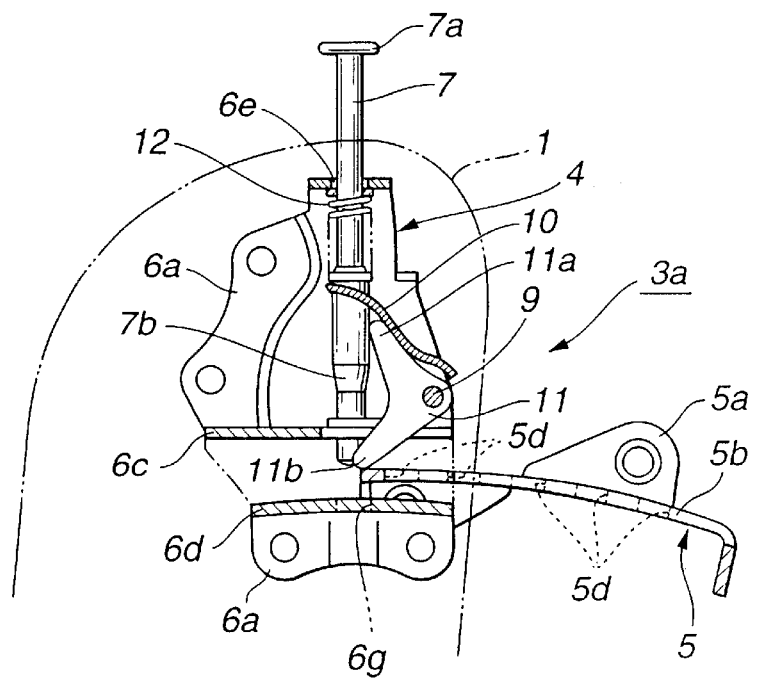
FIG. 6 is a sectional view similar to FIG. 4, but showing a condition wherein the seatback is pivoted to a raised position.

When now the seatback (1) is pivoted upward and brought near the raised position, the second arm portion (11b) of the lift lever (11) abuts the front edge of the lock plate (5), and thus the lift lever (11) is pivoted clockwise as is seen from FIG. 6. The clockwise pivoting of the lift lever (11) pivots the lift plate (10) in the same direction thereby lifting the lock pin (7) to the uppermost or unlocking position. Thus, the seatback (1) can arrive at the raised position without obstruction of the lock plate (5). Upon arrival at the raised position, the engaging portion (7b) of the lock pin (7) is moved until it engages the lock hole (5d) due to the force of the compression spring (12), and at the same time, the second arm portion (11b) of the lift lever (11) enters the guide slot (5c) causing the lift lever (11) and the lift plate (10) to assume their rest positions, as is seen from FIG. 2. That is, now, the seatback (1) assumes the raised locked condition again.

In the following, advantages of the present invention will be described.

When the seatback (1) is pivoted to the raised position by the force of the spring (12), the engaging portion (7b) of the lock pin (7) engages the lock hole (5d) of the lock plate (5) and holds the seatback (1) at a predetermined angle. Under this condition, the engaging portion (7b) of the lock pin (7) is supported by both the central support piece (6c) and the lower support piece (6d), and thus the engaging portion (7b) of the lock pin (7) is stably and reliably held.

When the seatback (1) is pivoted forward, the second arm portion (11b) of the lift lever (11) travels forward in the guide slot (5c) and abuts the front edge of the guide slot (5c), as shown in FIG. 4. Upon this, the lift lever (11) resists the force of the coil spring 13 and pivots in a counterclockwise direction from the rest position, as is indicated by the arrow. With this, the second arm portion (11b) comes out of the guide slot (5c), and the lift lever (11) is returned to the rest position due to the force of the coil spring (13).

When under the self-locked condition, the spring seat (7c) of the lock pin (7) rides on the lift plate (10), while the lock pin (7) passes through the rounded recess (10d) of the lift plate (10), allowing release of the lock pin (7). The lift plate (10) provides a wide area on which the spring seat (7c) can ride, guaranteeing release of the lock pin (7). If desired, the lift plate (10) may be removed, so that the first arm portion (11a) of the lift lever (11) directly contacts the spring seat (7c). With this, when the lift lever (11) is pivoted, the first arm portion (11a) lifts the spring seat (7c), releasing the lock pin (7). Thus, the lift plate (10) is not needed to release the lock pin (7).

The entire contents of Japanese Patent Application 11-141475 (filed May 21, 1999) are incorporated herein by reference.

Although the invention has been described above with reference to one embodiment of the invention, the invention is not limited to such an embodiment as described above. Various modifications and variations of such an embodiment may be carried out by those skilled in the art, in light of the above descriptions.

What is claimed is:

1. A lock device of a pivotal seatback, comprising:
   a base plate secured to said seatback;
   a lock pin held by said base plate, said lock pin being axially movable between locking and unlocking positions;
   first biasing means for biasing said lock pin toward said locking position;
   a lock plate secured to a fixed member, said lock plate having a plurality of lock holes with which said lock pin is engageable when assuming said locking position;
   a lift plate pivotally held by said base plate, said lift plate lifting said lock pin to said unlocking position when pivoted to a lift position from a rest position;
   a lift lever pivotally held by said base plate, said lift lever having first and second arm portions, said first arm portion being in contact with said lift plate so that when pivoted to a lift position from a rest position, said lift lever pivots said lift plate to said lift position; and
   second biasing means for biasing both said lift plate and said lift lever to assume their respective rest positions.

2. A lock device as claimed in claim 1, in which said lock plate is formed with a guide slot which extends along said lock holes, said guide slot being formed to receive therein said second arm portion of said lift lever.

3. A lock device as claimed in claim 2, in which, when said seatback is pivoted from a horizontal position toward a raised position, the second arm portion of said lift lever abuts against a front end of said lock plate causing the lift lever to pivot from the rest position to the lift position and then to the rest position thereby inducing a locked condition wherein the lock pin is engaged with one of said lock holes permitting said second arm portion of said lift lever to fall in said guide slot.

4. A lock device as claimed in claim 3, in which, when said seatback is pivoted from said raised position toward said horizontal position, the second arm portion of said lift lever abuts against a front end of said guide slot causing the lift lever to pivot from the rest position to a down position and then to the rest position thereby inducing an unlocked condition wherein said lock pin is disengaged from said lock holes separating said lift lever from said lock plate.

5. A lock device as claimed in claim 1, in which said lift plate and said lift lever are pivotally connected to said base plate by a common horizontal shaft.

6. A lock device as claimed in claim 5, in which said second biasing means comprises a coil spring which is disposed about said common horizontal shaft, said coil spring having one end hooked to a part of said lift plate and the other end hooked to a part of said base plate.

7. A lock device as claimed in claim 6, in which said second arm portion of said lift lever is contactable with the other end of said coil spring.

8. A lock device as claimed in claim 1, in which said first biasing means comprises a compression spring which is compressed between a part of said base plate and a part of said lock pin.

9. A lock device as claimed in claim 1, in which said base plate comprises upper, center, and lower support pieces which have aligned support holes respectively for slidably receiving therein said lock pin.

10. A lock device as claimed in claim 9, in which said center and lower support pieces define therebetween a groove which is sufficiently large to freely receive therein said lock plate.

11. A lock device as claimed in claim 10, in which said center support piece has a vertical support piece for supporting one end of said common horizontal shaft.

12. A lock device as claimed in claim 1, in which said lift plate has a rounded recess for receiving therein said lock pin.

13. A lock device as claimed in claim 1, in which said lock plate comprises upward and downward attachment portions which are to be attached to said fixed member.

14. A lock device as claimed in claim 13, which said fixed member is a side wall of a vehicle body.

* * * * *